US006081795A

United States Patent [19]

Ryan, Jr.

[11] Patent Number: 6,081,795

[45] Date of Patent: Jun. 27, 2000

[54] POSTAGE METERING SYSTEM AND METHOD FOR A CLOSED SYSTEM NETWORK

[75] Inventor: Frederick W. Ryan, Jr., Oxford, Conn.

[73] Assignee: Pitney Bowes Inc., Stamford, Conn.

[21] Appl. No.: 08/993,356

[22] Filed: Dec. 18, 1997

[51] Int. Cl.[7] ........................ G06F 17/00

[52] U.S. Cl. ........................ 705/408; 713/176

[58] Field of Search ........................ 705/408, 410, 705/403; 700/213, 225, 226, 227; 380/51, 55; 709/200, 203, 217, 218, 219; 703/60, 61, 62; 713/176, 180

[56] References Cited

U.S. PATENT DOCUMENTS

| | | | |
|---|---|---|---|
| 4,447,890 | 5/1984 | Duwel et al. | 705/403 |
| 4,725,718 | 2/1988 | Sansone et al. | 235/495 |
| 4,743,747 | 5/1988 | Fougere et al. | 235/494 |
| 4,757,537 | 7/1988 | Edelmann et al. | 380/51 |
| 4,760,532 | 7/1988 | Sansone et al. | 705/403 |
| 4,775,246 | 10/1988 | Edelmann et al. | 705/62 |
| 4,802,218 | 1/1989 | Wright et al. | 705/60 |
| 4,812,994 | 3/1989 | Taylor et al. | 705/410 |
| 4,831,555 | 5/1989 | Sansone et al. | 358/1.14 |
| 4,837,701 | 6/1989 | Sansone et al. | 705/404 |
| 4,853,865 | 8/1989 | Sansone et al. | 705/404 |
| 4,853,961 | 8/1989 | Pastor | 713/176 |
| 4,864,506 | 9/1989 | Storace | 705/403 |
| 4,873,645 | 10/1989 | Hunter et al. | 700/231 |
| 5,142,577 | 8/1992 | Pastor | 705/62 |
| 5,377,268 | 12/1994 | Hunter | 705/63 |
| 5,448,641 | 9/1995 | Pintsov et al. | 380/51 |
| 5,454,038 | 9/1995 | Cordery et al. | 705/60 |
| 5,510,992 | 4/1996 | Kara | 705/408 |
| 5,606,507 | 2/1997 | Kara | 705/408 |
| 5,666,421 | 9/1997 | Pastor et al. | 380/51 |
| 5,682,318 | 10/1997 | Kara | 705/402 |
| 5,682,427 | 10/1997 | Seestrom | 380/51 |
| 5,717,597 | 2/1998 | Kara | 705/408 |
| 5,723,825 | 3/1998 | Dolan et al. | 177/145 |
| 5,742,683 | 4/1998 | Lee et al. | 705/60 |
| 5,781,438 | 7/1998 | Lee et al. | 705/404 |
| 5,793,867 | 8/1998 | Cordery et al. | 705/60 |
| 5,802,175 | 9/1998 | Kara | 380/277 |
| 5,812,991 | 9/1998 | Kara | 705/410 |
| 5,819,240 | 10/1998 | Kara | 705/408 |
| 5,822,738 | 10/1998 | Shah et al. | 705/410 |
| 5,822,739 | 10/1998 | Kara | 705/408 |
| 5,832,191 | 11/1998 | Thorne | 358/1.15 |

*Primary Examiner*—Emanuel Todd Voeltz
*Assistant Examiner*—Thomas A. Dixon
*Attorney, Agent, or Firm*—Charles R. Malandra, Jr.; Michael E. Melton

[57] ABSTRACT

A postage metering system includes a plurality of meter printers operatively connected as part of a metering network and operating as client meter printers on the meter printer network. At least one postal security device (PSD) is coupled to at least one of the client meter printers (local client meter printer). The PSD includes unique identification the ability to store postal value and generate digital signatures. The client meter printers function as a postage metering network wherein a client meter printer other than the local client meter printer (remote client meter printer) requests evidence of postage payment from the PSD for concluding a postage metering transaction. The local client meter printer functions as a meter server and the remote client meter printer functions as a meter client on the postage metering network. The remote client meter printer initiates a postage metering transaction in the PSD by sending a request for evidence of postage payment to the local client meter printer. The local client meter printer sends the request for the evidence of postage payment to the PSD, receives transaction information from the PSD and sends the evidence of payment to the remote client meter printer for subsequent printing.

29 Claims, 6 Drawing Sheets

POSTAGE METERING SYSTEM AND METHOD FOR A CLOSED SYSTEM NETWORK

RELATED APPLICATIONS

The present application is related to the following U.S. patent applications Ser. Nos. 08/993,352, 08/993,353, 08/993,354, 08/993,355, 08/993,357 and 08/993,311, all filed concurrently herewith and assigned to the assignee of the present invention.

FIELD OF THE INVENTION

The present invention relates generally to a postage metering system and method for printing postage indicia using digital printing meters and, more particularly, to a postage metering system and method for printing postage indicia in a network of digital printing meters.

BACKGROUND OF THE INVENTION

Conventional mechanical and electronic postage meters have heretofore secured the link between printing and accounting. The integrity of the physical meter box has been monitored by periodic inspections of the meters. Digital printing postage meters, which are closed system postage meters, typically include a digital printer coupled to a metering (accounting) device, which is referred to herein as a postal security device (PSD). Digital printing postage meters have removed the need for physical inspection by cryptographically securing the link between the accounting and printing mechanisms. In essence, new digital printing postage meters create a secure point to point communication link between the accounting unit and printhead. See, for example, U.S. Pat. No. 4,802,218, issued to Christopher B. Wright et al and now assigned to the assignee of the present invention. An example of such digital printing postage meters is the Personal Post Office manufactured by the Pitney Bowes Inc. of Stamford, Conn.

In even a modest size mailroom it is common that several meters are present. It has been shown that funds can be stored in one central location for batch mailing purposes where evidence of postage payment for batch mail printed at several printers is evidenced through the printing of a statement summarizing the postage for the batch of mail. See U.S. Pat. Nos. 4,760,532 and 4,837,701, each assigned to the assignee of the present invention. However, this scheme has limitations. For example, a malfunction at the central location can result in all of the meters becoming unusable, since they have no access to additional funds. In addition, in large mailrooms it is common for mail to be processed for several different originating zip codes. Since each meter is assigned one originating zip code, meters are frequently moved from one mailing machine to another depending upon the mail processing needs.

SUMMARY OF THE INVENTION

It has been found that by placing all the meters in a mailroom on a network it is possible to print postage dispensed from a particular meter on a mailing machine other than the one to which it is attached. As a result, if any meter on the network fails, postage may be obtained from another meter on the network. Also, any mailing machine on the network may obtain postage from any meter, eliminating the need to move a meter from one mailing machine to another to comply with postal originating zip code requirements.

It has been found that a closed metering system can be implemented on a conventional local area, or wide area, network (including infrared and RF networks) to form a "Network Metering System". The Network Metering System includes a plurality of Client modules operatively coupled to a Network Server as part of a conventional network. The Network Metering System is configured with at least one PSD coupled to at least one of the Client modules, whereby authorized ones of the other Client modules on the network can obtain postage value from a PSD that is remote from the requesting Client module. Any Client module may have one or more PSDs attached thereto. Each Client module has access, if authorized, to both its own local PSD(s), if any, and any other Client module's PSD(s) ("remote PSDs") in the network.

Each Client module runs its own client metering application to dispense postage and to perform registration and refill operations. For each PSD in the Network Metering System, the Client module to which the PSD is coupled controls processing transactions for dispensing postage and registration and refill of the PSD. When performing such operations, the Client module functions as a server for the metering transaction, and is referred to herein as a "Meter Server". In a preferred embodiment of the Network Metering System the accounting for debits and credits to the PSD and the logging of transactions are performed on the Meter Server. Thus, the transaction processing is performed remotely when a Client module is accessing a remote PSD. In alternate embodiments, the logging of transactions is performed on a network server to which the Client modules are connected ("Network Server").

In the preferred embodiment, modems or internet connections for accessing the Data Center are located in the Meter Server. In alternate embodiments, the modem may be located in the PSD or the Client module (or another computer on the network) and the Internet connection may be in the Client module.

It has also been found that the Network Metering System can be configured such that each Client module dynamically knows which remote PSDs are available for use by such Client module, and that each Meter Server, i.e., each Client module with a PSD coupled thereto, dynamically knows which Client modules are on-line that are authorized to use the PSD coupled to the Meter Server.

There are several benefits that are realized from the present invention. One such benefit relates to the postal regulations requiring that the postage printed on a metered mailpiece must be obtained from a meter licensed from the local post office at which the mailpiece is deposited for mailing, commonly referred to as "origin of deposit" or "domain". With a plurality of PSDs accessible over a network, a user at a Client module is not limited to a single PSD having a single origin of deposit or domain. For example, while most mailing machines of a network metering system may be configured to deposit their mailpieces in the Post Office in Shelton, Conn., other mailing machines may be configured to deposit their mailpieces at different origins of deposit, such as New Haven, Conn. Furthermore, a Client module that is physically connected to a PSD with an origin zip of Shelton, Conn., may be processing mail to be deposited in New Haven, Conn. Since the New Haven acceptance mail facility is open later than the Shelton Facility. The present invention provides each Client module on the network with access to several PSDs having different origins of deposit.

Another benefit of the present invention is that mailpiece generation does not have to be interrupted because of PSD funds limitation. For example, when a large mail run requires more postal value than is stored on a single PSD, the Client module can access another PSD on the network to complete the mail run without having to interrupt the mail run to refill the PSD that is low on funds.

The present invention provides a postage metering system that includes a plurality of meter printer modules (also referred to herein as meter modules and meter printers) operatively connected as part of a metering network and operating as client meter printers on the metering network. At least one postal security device (PSD) is coupled to at least one of the client meter printers (local client meter printer). The PSD includes unique identification and the ability to store postal value and generate digital signatures. The client meter printers function as a postage metering network wherein a client meter printer other than the local client meter printer (remote client meter printer) requests evidence of postage payment from the PSD for concluding a postage metering transaction. The local client meter printer functions as a meter server and the remote client meter printer functions as a meter client on the postage metering network. The remote client meter printer initiates a postage metering transaction in the PSD by sending a request for evidence of postage payment to the local client meter printer. The local client meter printer sends the request for the evidence of postage payment to the PSD, receives transaction information from the PSD and sends the evidence of payment to the remote client meter printer for subsequent printing.

DESCRIPTION OF THE DRAWINGS

The above and other objects and advantages of the present invention will be apparent upon consideration of the following detailed description, taken in conjunction with accompanying drawings, in which like reference characters refer to like parts throughout, and in which.

DETAILED DESCRIPTION OF THE PRESENT INVENTION

Networking schemes for PC metering, which have been disclosed in the previously noted related applications, allow each client on a network to dynamically maintain a list of available Postal Security Devices (PSDs), or meters, on the network. Related U.S. patent applications Ser. Nos. 08/993,352 and 08/993,353 describe the dynamic management of several open system PSDs on a network. It is well known that PC meters use open system meters. An open system meter's printing unit is not coupled to its PSD. However, in a conventional closed system the accounting unit (also referred to herein as PSD) and printing unit are coupled via a secure point to point communication link. The present invention extends the open system networking schemes to closed systems or traditional meters. It has been found that by placing closed system PSDs on a network the same techniques may be used by mailing machines and PSDs to dynamically maintain a list of available PSDs and printers. In addition, a secure communications link can be routed over the closed system network from any PSD to any printing unit, allowing any mailing machine to print postage dispensed by any PSD on the network.

Figure 1:
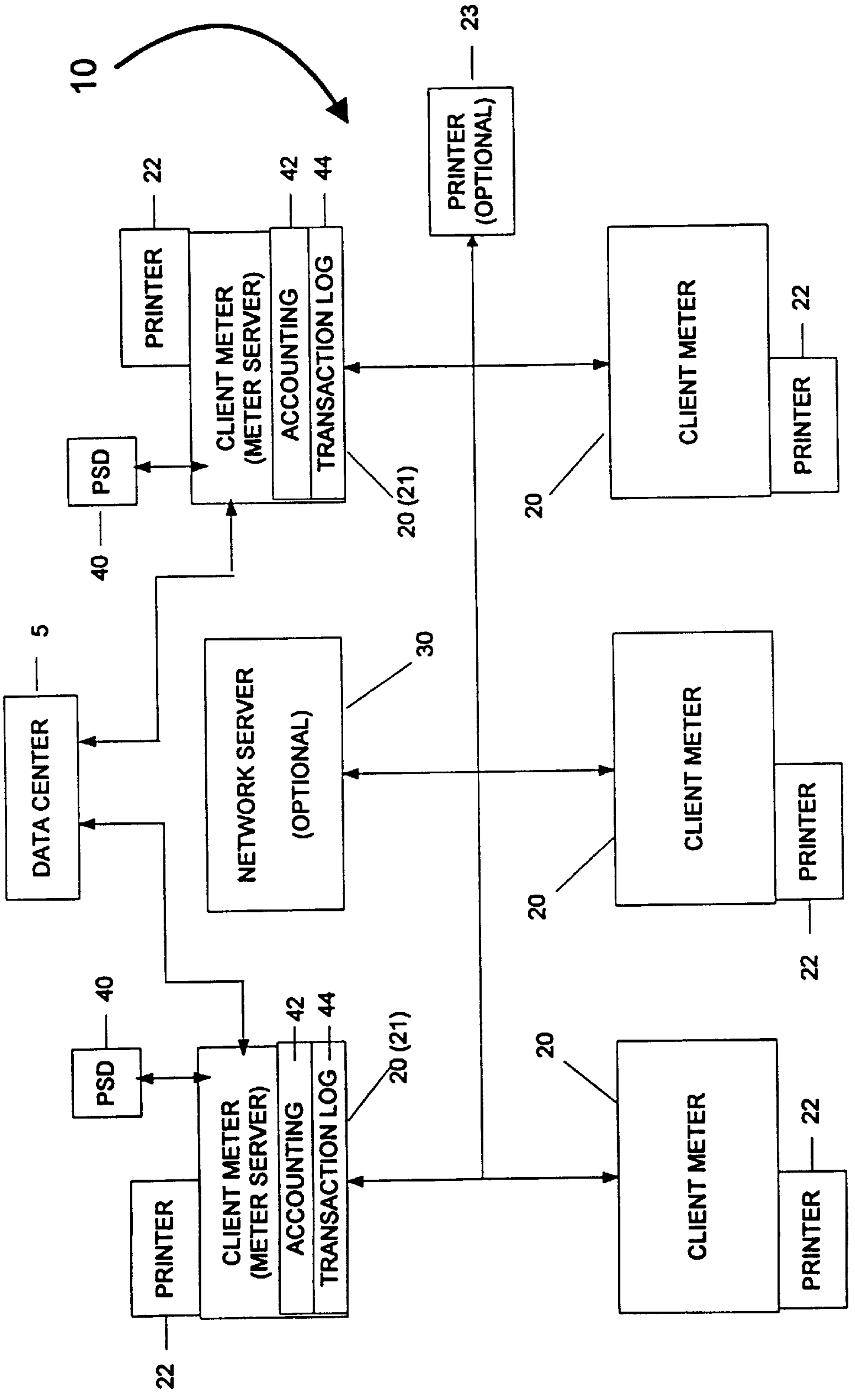
FIG. 1 is a block diagram of a Network Metering System with PSDs couple to Client modules in accordance with the preferred embodiment of the present invention.

In describing the present invention, reference is made to the drawings, wherein there is seen in FIGS. 1–2, alternate embodiments of a Network Metering System. FIG. 1 shows the preferred embodiment of the present invention. A Network Metering System, generally designated 10, includes a plurality (five are shown) of Client modules 20 conventionally coupled to a Network Server 30, such as a personal computer. The Client modules are digital printers that are dedicated to printing postage indicium and meter or PSD related information, such as refill receipts and inspection cards. Each Client module resembles a conventional digital metering system with optional display, keyboard, and printer 22, however, some of the Client modules do not have an accounting module or PSD attached thereto. Preferably, a plurality of PSDs 40 (two are shown) exists in Network Metering System 10, with at least one PSD 40 being coupled to several Client modules 20. The PSDs 40 are accounting modules similar to accounting units in conventional electronic postage meters. When a specific PSD 40 is accessed for a metering transaction, the Client module 20, to which the PSD 40 is attached, becomes a Meter Server 21 (shown within parenthesis) for the remainder of the transaction. When the PSD 40 is being accessed by the Client module 20 to which the PSD is coupled the Client module 20 is functioning as a conventional meter.

Figure 2A:
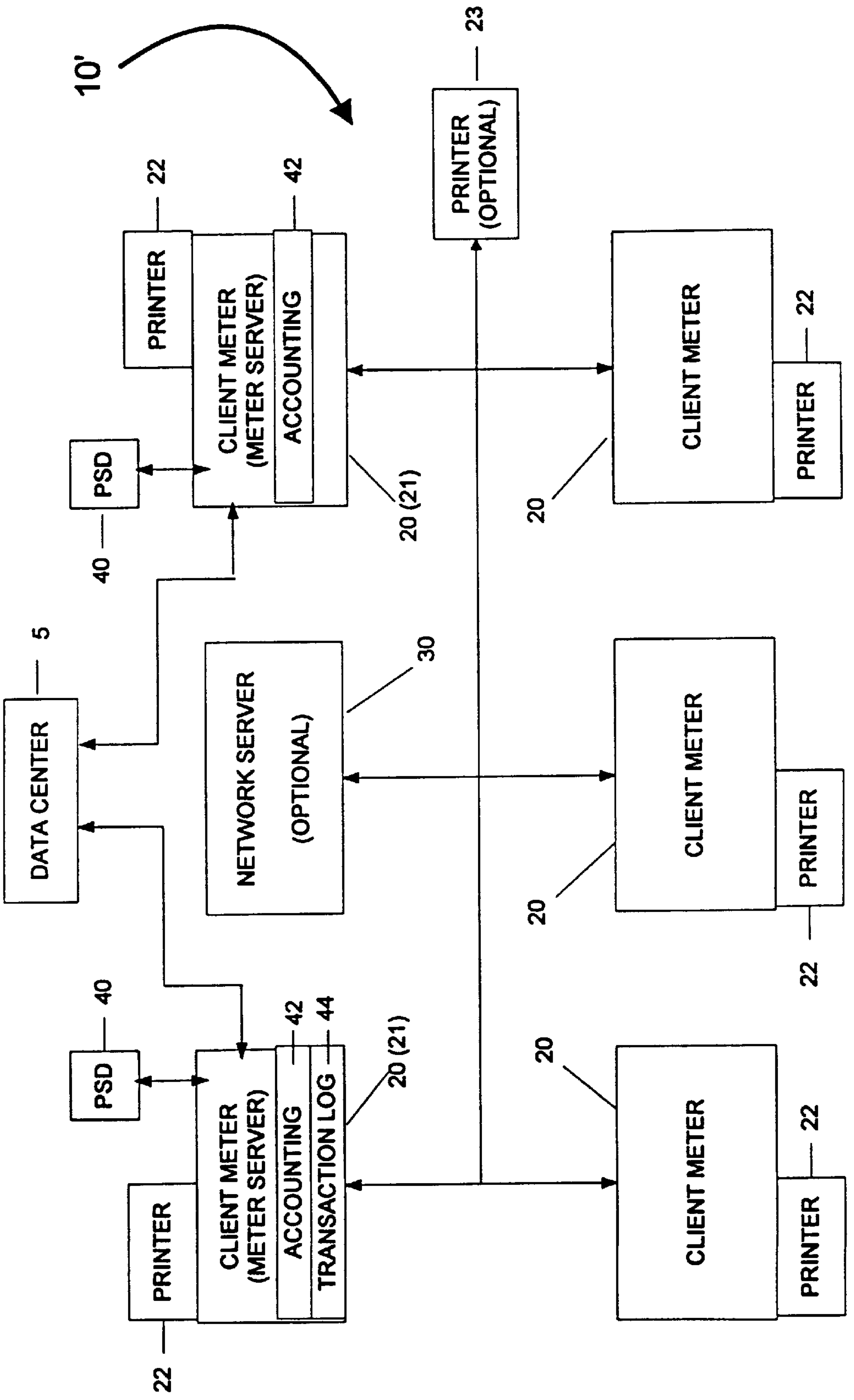
FIG. 2 (2A and 2B) are block diagrams of alternate embodiments of a Network Metering System with PSDs couple to Client modules with a centralized transaction log.
Figure 2B:
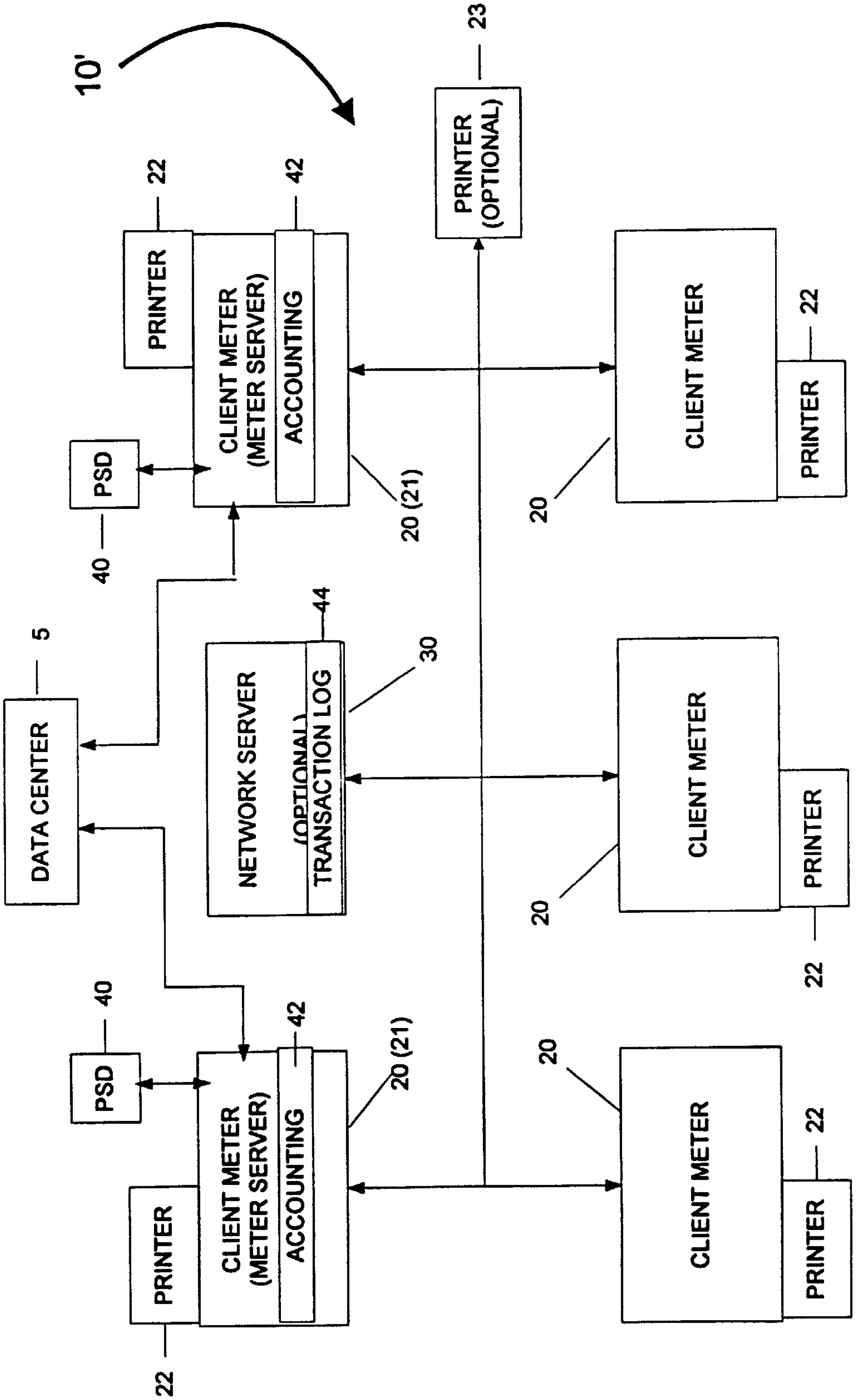
Figure 3:
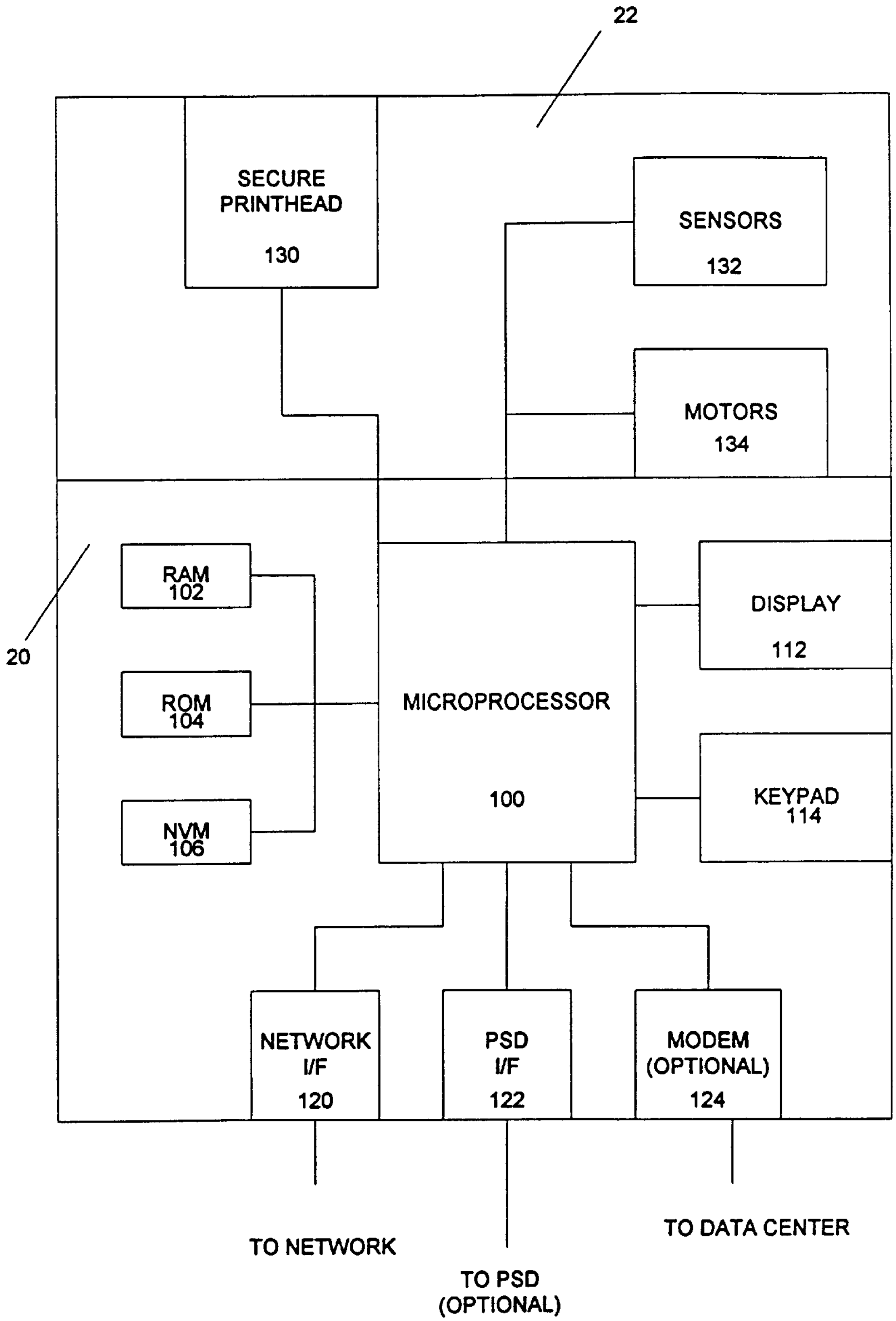
FIG. 3 is a block diagram of a Client module.

Referring now to FIG. 3, a Client module 20 includes a microprocessor 100 coupled to memory modules RAM 102, ROM 104 and non-volatile memory (NVM) 106 and to user interface modules display 112 and keypad 114. Client module 20 further includes a network interface 120, a PSD interface 122 and an optional modem 124. ROM 104 contains the operating programs from Client module 20 including a Meter Toolkit 110 which is described below. NVM 106 stores transaction and accounting logs for the Client module 20, network ID for the client module 20, and a preference list of available PSDs on the network (described below). Client module 20 physically connects to the network through network interface 120. PSDs are optionally connected to Client module 20 through PSD interface 122. Communications to a Data Center 5 (FIGS. 1 and 2) are made through optional modem 124. Printer 22 includes a secure printhead 130, sensors 132 for sensing printing functions, and motors 134 for activating printer functions and controlling the flow of mailpieces through the system. Printer 22 is coupled to Client module 20 in a conventional manner, whereby microprocessor 100 controls printhead 130.

Client module 20 processes the functions for PSD registration, PSD refill, and postage dispensing as transactions for any PSD 40 coupled thereto. Processing is performed locally by metering software component 110 (referred to herein as "Meter Toolkit"). In the preferred embodiment, Meter Toolkit 110 is a program module with interfaces to perform metering operations. One such interface maintains a list of local and remote PSDs on the network. This interface maintains a current list of all known and attached PSDs at the time it is instantiated. Meter Toolkit 110 includes the following components: a transaction handler, a vault interface, a transaction log handler and an optional secure communications handler as described in the U.S. patent application Ser. No. 08/864,929 and previously noted U.S. Pat. No. 4,802,218. Connections to the Data Center 5 can be made locally from the Client module 20, in standalone mode via modem 124. Accounting for debits and credits to the PSD are also performed locally, logging the transactions in the NVM 106. In this manner, the transaction processing and funds accounting are centralized on the Client module operating a stand-alone meter. The Meter Toolkit 110 provides standard metering functions, such as dispensing postage, PSD refills, and PSD registration and secure communications. The Meter Toolkit 110 resides in all Meter Servers and remote Client modules capable of printing postage. Client module 20 can access local or remote PSDs using Meter Toolkit 110. The Meter Toolkit 110 provides a list of the available PSDs from which a desired PSD for a particular transaction is selected. Using Meter Toolkit 110 the Client module 20 may automatically select a secondary PSD if the desired PSD is unavailable due to malfunction or lack of funds. Optionally, a user may specify the desired PSD.

Examples of a conventional digital metering system are PostPerfect™ and Personal Post Office™ meters manufactured by Pitney Bowes Inc. of Stamford, Conn. It will be understood by those skilled in the art that conventional electronic meters, such a the A900 meter, which is also manufactured by Pitney Bowes Inc. of Stamford, Conn., may also be configured into a network. However, the configuration will be somewhat more involved than the network configuration of the preferred embodiment for digital meters.

The printer may be unsecured or may be securely coupled as described in U.S. patent application Ser. No. 081864,929, filed May 29, 1997, entitled SYNCHRONIZATION OF CRYPTOGRAPHIC KEYS BETWEEN TWO MODULES OF A DISTRIBUTED SYSTEM and assigned to the assignee of the present invention, or in U.S. Pat. No. 4,802,218, issued to Christopher B. Wright et al and now assigned to the assignee of the present invention.

It has been found that the printer may be a conventional mailing machine, TM such as Paragon™, manufactured by Pitney Bowes of Stamford, Conn., or may be a printer dedicated to printing some type of indicium, for example a label printer.

In the preferred embodiment, the postal funds accounting and the transaction processing occur in the Meter Server 21. It will be understood that this is a decentralized approach concerning funds accounting and transaction accounting because each Client module 20 having a PSD 40 attached thereto maintains accounting information (departmental accounting registers 42) and transaction information (transaction log's 44) relating to transactions occurring only at its PSD 40.

Figure 4:
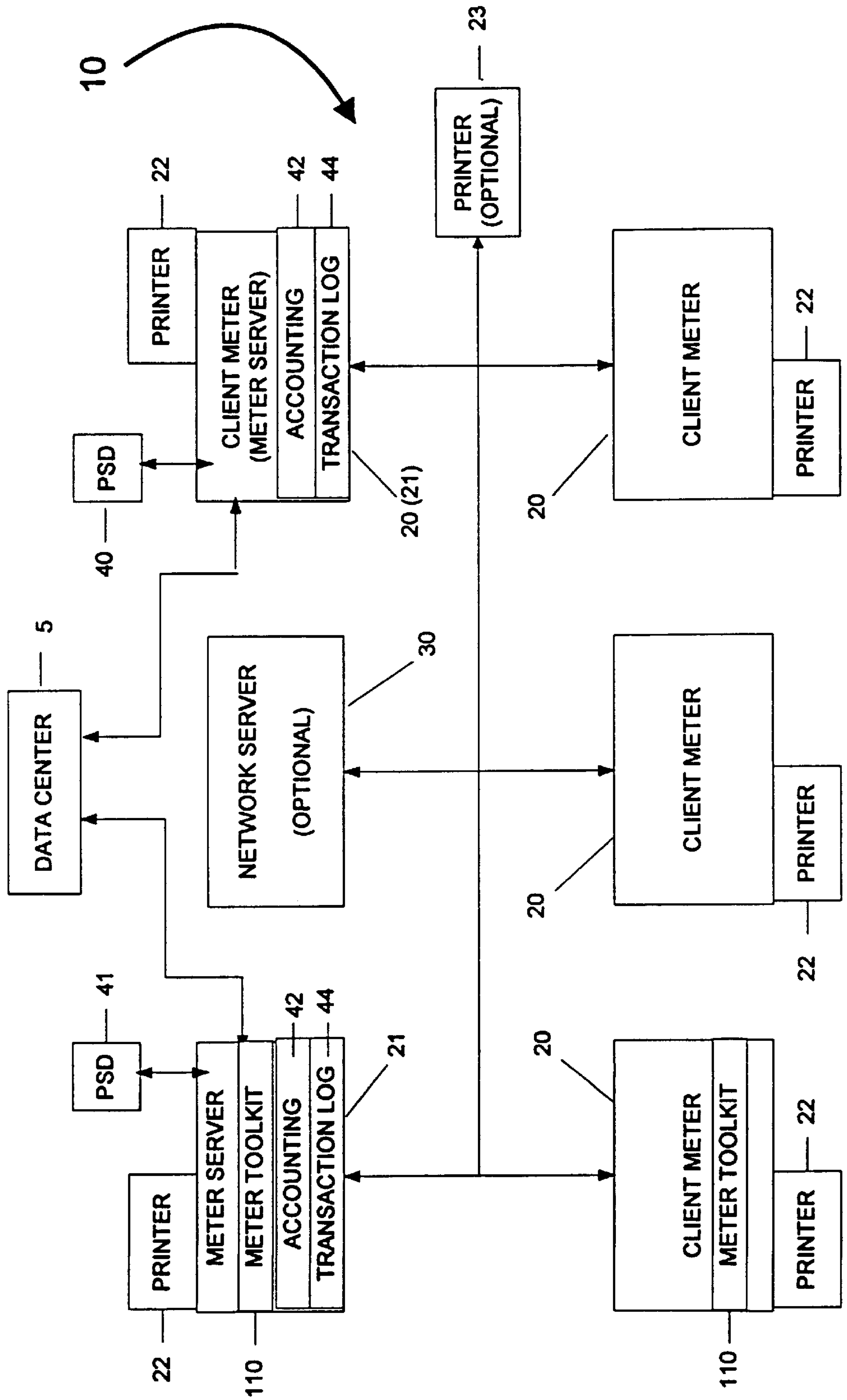
FIG. 4 is a block diagram of the preferred embodiment of a Network Metering System of FIG. 1 with a Client module in Meter Server mode.
Figure 5:
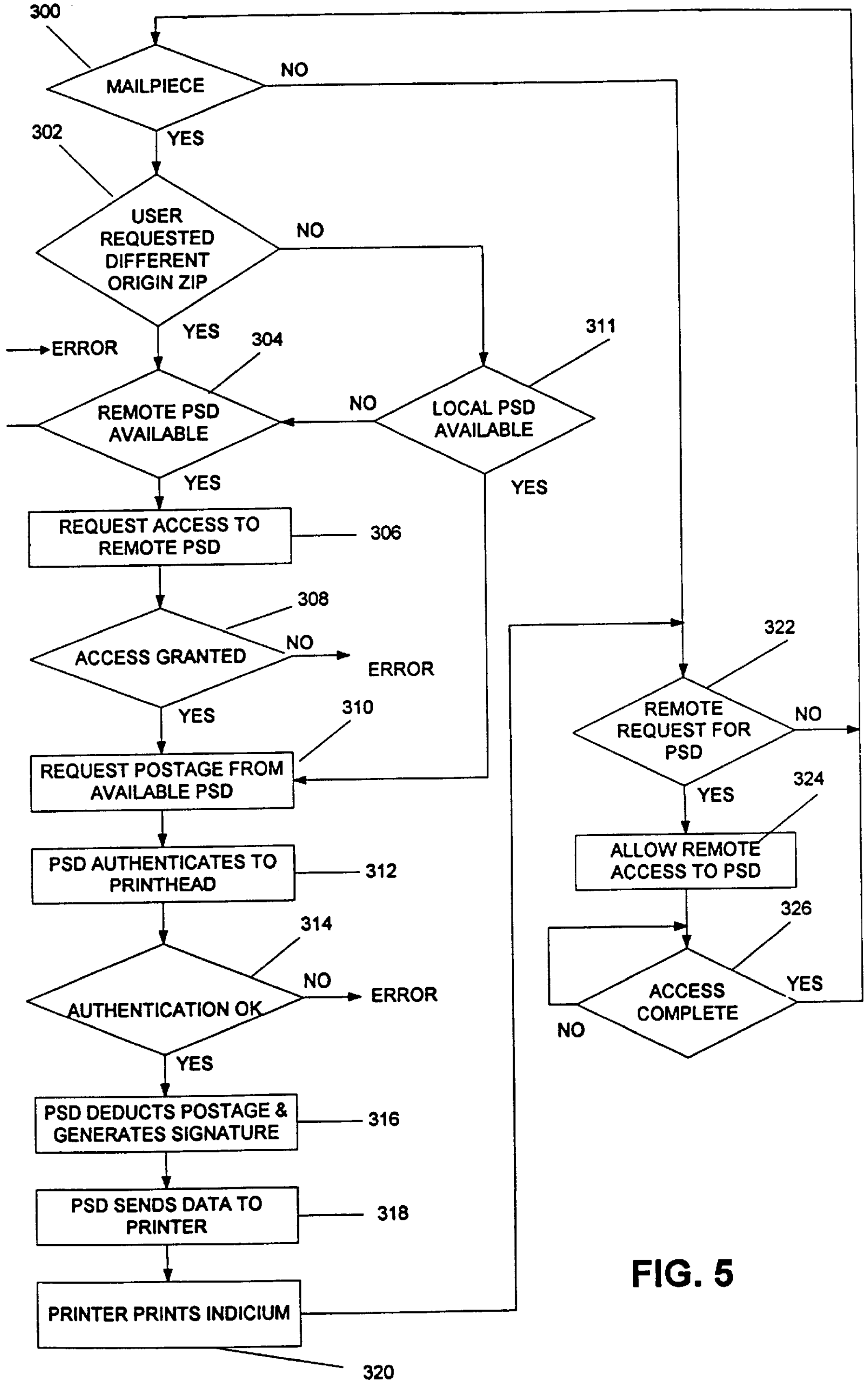
FIG. 5 is a flow chart of a Client module operation.

FIGS. 2A and 2B show alternate embodiments of the present invention. Network Metering System, generally designated 10', includes a plurality (five are shown) of Client modules 20 conventionally coupled to a network server 30. Each PSD 40 (two are shown) of Network Metering System 10' is coupled to one of Client modules 20. Each Client module includes a conventional digital metering system with display, keyboard, and printer 22. As in the preferred embodiment, a plurality of PSDs exists in Network Metering System 10', with at least one PSD 40 being coupled to several Client modules 20. When the specific PSD is accessed for a metering transaction, the Client module 20, to which the PSD 40 is attached, becomes a Meter Server 21 for the remainder of the transaction (FIG. 4). In this embodiment the postal funds accounting occurs in Meter Server 21 when the transaction has been concluded. However, the transaction processing occurs at Network Server 30. It will be understood that this is a decentralized approach concerning funds accounting because each Client module 20 that has a PSD 40 attached thereto maintains accounting information (accounting registers 42) relating to transactions occurring only at its PSD. However, this embodiment provides a centralized approach concerning transaction accounting because one of the Meter Servers 21 (FIG. 2A) or Network Server 30 (FIG. 2B) maintains transaction information (transaction logs 44) relating to transactions occurring at any PSD.

Referring again to FIGS. 1 and 2, Network Metering Systems 10 and 10' are configured with one or more PSDs 40 coupled to one or more Client modules 20. In such configurations, the Client module 20 becomes a Stand-alone Meter when a metering transaction is processed locally on its coupled PSD 40. When operating as a Stand-alone Meter, such Client module 20 performs the previously described metering transaction, acting As both the requesting Client module and the Meter Server. As a Stand-alone Meter, Client module 20 can only access the PSD 40 coupled to it. There is no remote vault access when a Client module is processing a metering transaction on the local PSD.

The network concept provides mechanisms for a remote Client module to gain access rights to the Meter Toolkit component in a Meter Server. Optionally, every Client module can be given access rights to the Meter Server, whereby the Meter Server's PSD PIN (password) can be used to authorize access to postage functions in the Meter Server and its PSD. By default, all PSDs are considered remotely accessible by all Client modules unless configured differently by the user. Alternatively, the list of available PSDs can be customized based on user or system filters. For example, only sharing PSDs whose origin zip match the origin ZIP of the local PSD.

Meter Toolkit 110 provides postal funds security because the user can not print an indicium without accounting for a debit to the PSD. The Meter Toolkit uses atomic transactions to tie the debit to PSD with the enabling of printing of the indicium image. The atomic transaction ensures that the debit to the PSD is complete before printing the indicium. In addition, the Meter Toolkit 110 may establish a secure link between the PSD 40 and meter printer 20 as described in the previously noted U.S. patent application Ser. No. 08/864,929 and U.S. Pat. No. 4,802,218.

The transaction log stores funds transactions for PSD dispensing and refills. For Network Metering System 10, each Client module stores the daily transaction log file for its local PSD(s). For Network Metering System 10', each Client module forwards transaction information for its local PSD(s) to Network Server 30 which stores the daily transaction log file. Once the accounting for a mailpiece transaction is completed, the Client module requesting the transaction prints the indicium.

Network Metering System (10 or 10') has many Client modules with or without PSD(s) attached. Each Client module has access to both its own local PSD(s) and remote PSDs in the network. Each Client module can dispense postage and initiate registration and refills.

As previously stated, Network Metering System (10 or 10') processes transactions for dispensing postage, PSD registration, and PSD refill on the Client module 20 where the specific PSD 40 is located. This requires the transaction processing to be performed remotely if the Client module is accessing a remote PSD. Modems for accessing Data Center 5 are preferably located on the each Client module 20 having a PSD 40 coupled thereto. However, a single modem may be located on the Network Server 30 instead of several modems on each Client module 20 having a PSD 40 coupled thereto. In this manner, PSD registrations, and PSD refills are processed through Network Server 30.

Referring now to FIG. 4, a Client module 20 enters Meter Server 21 mode when another Client module 20 on the network initiates remote access of PSD 41 through its Meter Toolkit 110. Meter Server 21 processes the functions for PSD registration, PSD refill, and postage dispensing as transactions for PSD 41. Processing is performed at Meter Server 21 by the previously described Meter Toolkit 110 residing in Meter Server 21 and at Client module 20 by the Meter Toolkit 110 residing in Client module 20.

The Meter Toolkits 110 residing in the Client module 20 and the Meter Server 21 operate in conjunction with each other such that the remote requesting Client module 20 and Meter Server 21 operate collectively as a meter. The Meter Toolkit 110 residing in Meter Server 21 handles messages from and to the requesting Client module 20, and handles standard metering functions, such as dispensing postage, PSD refills, and PSD registration, for PSD 41 in the same manner as when in stand-alone mode.

Referring now to FIG. 6, at step 300 Meter Toolkit 110 checks for a local request for printing an indicium on a mailpiece by the local Client module. If no request is detected, then the process continues at step 322 described below. If a request is detected, then, at step 302, Meter Toolkit 110 checks if the user has previously requested an origin zip different from the origin zip of the local Client module. If the request is for a different origin zip, then, at step 304, it checks if a remote PSD having the requested zip is available. If available, at step 306, local client module 20 through its Meter Toolkit 110 requests access to the remote PSD. If not available then an error is reported. If access is granted, at step 308, then at step 310, local client module 20 requests postage from the remote PSD. If access is not granted then an error is reported.

At step 312, the PSD authenticates to the printhead in the Client module. If the authentication is successfully completed, at step 314, then, at step 316, the PSD performs postal accounting and generates a signature for the transaction. At step 318, the PSD sends transaction information, including the signature, to the Client module. At step 320, the Client module prints an indicium.

At step 322, Meter Toolkit 110 checks for a request from a remote Client module for access to the local PSD. If no request has been received, the process continues at step 300. If a request has been received, then, at step 324, Meter Toolkit 110 allows remote access to PSD and processes the request from the remote Client through completion at step 326.

If at step 302, the user has not requested a different origin zip than the local PSD, then, at step 311, Meter Toolkit 110 checks if the local PSD is available to respond to the request. If the local PSD is available then the process continues at step 310 which is described above. If not available, the Meter Toolkit 110 checks the availability of remote PSDs at step 304 above.

Networked Operations

Through the use of Meter Toolkit 110 meter printers 20 can communicate via a mechanism referred to as connection points, which can be used to implement direct communication, multi-casting (more than one client receives messages), or broadcasting (all clients receive messages). This can be done between processes on the same meter printer or multiple meter printers on a network or on the internet. Mail slots is another mechanism that permits the same communications facilities. The Meter Toolkit 110 uses these facilities to exchange information about the location and disposition of PSDs on the network.

When a Client module logs into the network, the Meter Toolkit 110 running on the Client module registers the necessary connection points; one common to all Meter Toolkits on the network, and one specific to the Client module itself. The common connection point is used to send and receive multi-casted messages from all Clients. The specific connection point is for messages intended solely for one particular Client module Meter Toolkit, such as a request or response for evidence of postage payment.

Upon initialization, the Client module's Meter Toolkit 110 uses the common connection point to send a message for all other Meter Toolkits to respond with available PSDs. Meter Toolkits running on Meter Servers 21 then respond to the Client module's specific connection point with information about the location and identities of any attached PSDs. Referring to FIG. 2A, the list of available PSDs is consolidated and presented to applications that require postage metering functions. Referring to FIG. 2B, the list of available PSDs is consolidated along with locally attached PSDs and the complete list presented to applications that require postage metering functions. In this case, the Meter Toolkit 110 also sends messages to the common Meter Toolkit connection points indicating that another PSD is available for use by other Meter Toolkits.

When a remote Client module 20 selects a PSD 40 to use, the Meter Toolkit 110 uses the information collected at initialization to know where the particular PSD is located, and how to communicate with it.

In operation, the Meter Toolkit 110 also handles messages regarding the status of Meter Toolkits 110 on the network. Should new Meter Toolkits be started on other Client modules 20, the local Meter Toolkit responds with information regarding any attached PSDs 40. Should messages be received indicating that a new Meter Client 20 has come on-line with its own PSD(s) 40, the Meter Toolkit updates its list of available PSDs. Similarly, if a Client module 20 is shutting down, messages are sent to all Client modules indicating that any local PSDs will no longer be available. It is noted that all messages between Meter Toolkits 110 can be encrypted for added security.

The effect of the Client module Startup and Shutdown multi-casts is that all Client modules 20 dynamically know exactly which PSDs 40 are available. Clients also have the ability to ask explicitly for a refreshed list of available PSDs 40 since it is possible that a meter printer can go off-line without proper notification. Meter Toolkit 110 also provides mechanisms for this with continual pinging to catch computers improperly notifying clients/servers.

Centralized vs. Distributed Processing on the Network

A Metering system must account for funds for all mail pieces and refills. This requires saving transaction records in a sequential transaction log file. Both postage dispensing and refills should be kept in the same sequential file such that meter discrepancies, such as discrepancies due to meter movement between Client modules on the network, can be reconciled. The following paragraphs summarize the impact of using centralized vs. decentralized accounting for the transaction log on a network metering system.

In a network metering configuration, if accounting for funds is summarized by a user, transactions could be logged where the user is located. This would require consolidating log files only if the user has more than one meter printer at which transactions can be initiated, i.e., the user moves between meter printers). This method uses decentralized accounting, logging transactions on the user's meter printer.

If accounting for funds is summarized by a meter, transactions should be logged where the meter, i.e. the PSD, is located. This would require consolidating log files only if the PSD could be attached to any meter printer (PSD moves between meter printers). This method uses decentralized accounting, logging transactions on the PSD's meter printer.

If accounting for funds is summarized by department (i.e. departments have several users that can access several PSDs), transactions must be consolidated if the logging of transactions was performed where the user is located or where the PSD is located.

An alternative to such consolidation of log files from meter printers is a centralized accounting and logging of all transactions on same or a centralized server. Transactions would have to be sent to the Network Server for every mail piece, producing heavy network traffic. If the centralized server is down, or otherwise not available, then no postage dispensing or refills can occur, disabling metering capabilities over the entire network. A centralized server for Network Metering System is not the preferred embodiment of the present invention.

Network Metering Systems 10 and 10' are representative of distributed processing of the metering transaction. Network Metering System 10 involves local transaction processing requested by a requesting Client module 20, and remote accounting and logging at the Meter Server 21, i.e., where the PSD 40 and transaction log file 44 are located. Network Metering System 10' involves local transaction processing by the requesting Client module 20, remote accounting at the Meter Server 21, i.e., where the PSD 40 is located, and remote logging at the Network Server 30, i.e. where transaction log file 44 is located. Thus, the transaction processing is split from the accounting Functionality in distributed processing. The steps of the transaction are split between different meter printers of the network:

There is an advantage to configuring network metering for distributed processing, such as In Network Metering Systems 10 and 10'. If Network Server 30 is down, metering transactions may still be performed when Client modules having PSDs coupled thereto operate in stand-alone mode. Furthermore, network-metering transactions may be performed even when a Client module 20 with a PSD attached thereto is not logged on the network. For example, the Client module not logged on the network can operate in stand-alone mode, and the Client modules logged on the network can access other Client modules having PSDs coupled thereto.

When a Client module is attempting to access remote PSDs on the network, an optional prioritized list of available PSDs can be set up for automatic selection by the Client module 20. The prioritized ordering of the available PSDs may use the following heuristics:

1. Local PSDs (same location as the Client module)
2. Remote PSDs sharing the same origin ZIP as the local PSDs
3. PSDs having the same three digit ZIP as items 1–3
4. Remaining PSDs The present invention has been described for credit locking meters, i.e. those with ascending and descending registers commonly referred to as prepayment systems. It is noted, however, that the present invention is also suitable for use in current account register systems, i.e., those with only an ascending register commonly referred to as post-payment systems.

It will be understood that although the embodiments of the present invention are described as postage metering systems, the present invention is applicable to any value metering system that includes transaction evidencing, such as monetary transactions, item transactions and information transactions. While the present invention has been disclosed and described with reference to embodiments thereof, it will be apparent, as noted above, that variations and modifications may be made therein. It is, thus, intended in the following claims to cover each variation and modification that falls within the true spirit and scope of the present invention.

Personal Post Office, PostPerfect and Paragon are all trademarks of Pitney Bowes Inc.

What is claimed is:

1. A postage metering system comprising:

a plurality of dedicated meter printers operatively connected as part of a metering network and operating as client meter printers on the metering network;

at least one postal security device (PSD) coupled to at least one of the client meter printers, local client meter printer, said PSD including unique identification, postal value storage means and digital signature means;

means in said client meter printers for functioning as a postage metering network wherein a client meter printer other than the local client meter printer (remote client meter printer) requests evidence af postage payment from the PSD for concluding a postage metering transaction.

2. The system of claim 1 wherein the local client meter printer functions as a meter server and the remote client meter printer functions as a meter client on the postage metering network.

3. The system of claim 2 wherein the remote client meter printer initiates a postage metering transaction in the PSD by sending a request for evidence of postage payment to the local client meter printer, said local client meter printer sends the request for the evidence of postage payment to the PSD, and wherein said local client meter printer receives transaction information.

4. The system of claim 3 wherein the evidence of payment is sent from the local client to the remote client meter printer for subsequent printing.

5. The system of claim 1, wherein said meter printers are mailing machines.

6. The system of claim 1, wherein said meter printers are label printers.

7. The system of claim 3 wherein the evidence of payment includes the postage amount and a digital signature unique to the postage metering transaction.

8. The system of claim 4 wherein the remote client meter printer prints an indicium on a mailpiece, said indicium including the postage amount and the digital signature.

9. The system of claim 3 wherein the local client meter printer determines whether the remote client meter printer is authorized to request the postage amount from the PSD before sending the request for the postage amount to the PSD.

10. The system of claim 3 wherein the PSD determines whether the remote client meter printer is authorized to request the postage amount from the PSD before dispensing the postage amount to the local client meter printer.

11. The system of claim 3 wherein the PSD generates the digital signature and performs accounting for the postage metering transaction, said local client meter printer storing transaction information received from the PSD.

12. The system of claim 3 wherein the PSD generates the digital signature and performs accounting for the postage metering transaction, said local client meter printer sending all transaction information received from the PSD to a network server for the meter printer network.

13. The system of claim 1 wherein a plurality of PSDs are coupled to a subset of the client meter printers.

14. The system of claim 1, further comprising:

means in the remote client meter printer for initiating a postage metering transaction including means for sending a request for evidence of postage payment to the local client meter printer;

means in said local client meter printer for forwarding the request for the evidence of postage payment to the PSD, means in said local client meter printer for receiving from the PSD transaction information including a postage amount and a digital signature unique to the postage metering transaction;

means for sending at least the postage amount and the digital signature to the remote client meter printer; and means in said remote client meter printer for generating an indicium, including the postage amount and the digital signature, for the postage metering transaction.

15. A transaction evidencing system comprising:

a plurality of dedicated meter printers operatively connected as part of a metering network and operating as client meter printers on the meter printer network;

at least one security device coupled to at least one of the client meter printers, local client meter printer, said security device including unique identification, value storage means and digital signature means;

means in said client meter printers for functioning as a transaction evidencing network wherein a client meter printer other than the local client meter printer (remote client meter printer) requests and obtains transaction evidencing from the security device for concluding a transaction at the remote client meter printer.

16. The system of claim 15 wherein the local client meter printer functions as a transaction server and the remote client meter printer functions as a transaction client on the transaction evidencing network.

17. The system of claim 16 wherein the remote client meter printer initiates transaction accounting in the security device by sending a request for transaction evidencing to the local client meter printer, said local client meter printer sends the request for the transaction evidencing to the security device, and wherein said local client meter printer receives transaction information unique to the requested transaction evidencing, said transaction information including a digital signature, and wherein said local client meter printer sends at least the digital signature to the remote client meter printer.

18. The system of claim 17 wherein the transaction evidencing is sent from the local client to the remote client meter printer for subsequent printing.

19. The system of claim 17 wherein the remote client meter prints evidence of the transaction, said evidence including the digital signature.

20. The system of claim 17 wherein the local client meter printer determines whether the remote client meter printer is authorized to request the transaction evidencing from the security device before sending the request to the security device.

21. The system of claim 17 wherein the security device determines whether the remote client meter printer is authorized to request the transaction evidencing from the security device before performing the transaction evidencing.

22. The system of claim 17 wherein the security device generates the digital signature and performs accounting for the transaction, said local client meter printer storing transaction information received from the security device.

23. The system of claim 17 wherein the security device generates the digital signature and performs accounting for the transaction, said local client meter printer sending all transaction information received from the security device to a network server for the meter printer network.

24. The system of claim 15 wherein a plurality of security devices are coupled to a subset of the client meter printers.

25. The system of claim 19 wherein the local client meter printer includes means for maintaining transaction information relating to transaction evidencing processed by the security device.

26. The system of claim 15, further comprising:

means in the remote client meter printer for initiating a transaction including means for sending a request for a transaction evidence to the local client meter printer;

means in said local client meter printer for forwarding the request for the transaction evidence to the security device, means in said local client meter printer for receiving from the security device transaction information including the transaction evidence and a digital signature unique to the transaction;

means for sending at least the transaction evidence and the digital signature to the remote client meter printer; and means in said remote client meter printer for generating an indicium, including the transaction evidence and the digital signature, for the transaction.

27. A method for printing postage on a mailpiece, the method comprising the steps of:

connecting a plurality of dedicated meter printers as part of a metering network;

providing a postal security device (PSD) coupled to at least one of said plurality of meter printers, wherein the other of said plurality of meter printers are remote to the PSD, the PSD being a secure processor-based accounting device that dispenses and accounts for postal value stored therein;

sending a request from the remote meter printer to the local meter printer for an amount of the postal value stored in the PSD, the request comprising postal information, including data representative of the amount of the postal value to be printed on a mailpiece by the remote meter printer, dispensing me requested amount of postal value by generating in the PSD a digital signature representing the requested amount and accounting for the requested amount;

sending the digital signature and the transaction information from the PSD to the local meter printer;

sending the digital signature and at least some of the transaction information from the local meter printer to the remote meter printer; and printing an indicium including the digital signature on the mailpiece.

28. The method of claim 27, further comprising the steps of:

verifying at the local meter printer that the remote meter printer is authorized to access the postal value stored in the PSD.

29. A method for printing postage on a mailpiece, the method comprising the steps of:

connecting a plurality of dedicated meter printers as part of a metering network;

providing first and second postal security devices (PSD) coupled to first and second of said plurality of meter printers, the PSD being a secure processor-based accounting device that dispenses and accounts for postal value stored therein; and automatically sending a request from the first local meter printer to the second local meter printer for an amount of the postal value stored in the second PSD, when the first PSD is unavailable for providing an amount of postal value.

* * * * *